(12) United States Patent
Welch et al.

(10) Patent No.: US 6,932,850 B1
(45) Date of Patent: Aug. 23, 2005

(54) PLEATED FILTER AND A METHOD FOR MAKING THE SAME

(75) Inventors: Thomas C. Welch, Homer, NY (US); Joseph Verschneider, Cortland, NY (US); John D. Miller, Sunnyside, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/720,197

(22) PCT Filed: Jun. 29, 1999

(86) PCT No.: PCT/US99/14439
§ 371 (c)(1),
(2), (4) Date: Apr. 10, 2001

(87) PCT Pub. No.: WO00/00270
PCT Pub. Date: Jan. 6, 2000

Related U.S. Application Data
(60) Provisional application No. 60/091,042, filed on Jun. 29, 1998.

(51) Int. Cl.$^7$ ............................................. B01D 27/06
(52) U.S. Cl. ........................ 55/521; 55/DIG. 5; 96/67; 264/286; 264/287; 264/DIG. 48
(58) Field of Search ............................ 55/521, DIG. 5; 96/67, 69; 264/286, 287, DIG. 48

(56) References Cited

U.S. PATENT DOCUMENTS

| | | | |
|---|---|---|---|
| 2,936,855 A | 5/1960 | Allen et al. ................... | 55/498 |
| 3,552,704 A | 1/1971 | Pond .......................... | 248/342 |
| 3,583,711 A | 6/1971 | Engleman ................... | 277/632 |

(Continued)

FOREIGN PATENT DOCUMENTS

| | | | | |
|---|---|---|---|---|
| EP | 692294 | * | 1/1996 | |
| EP | 808 648 | | 11/1997 | |
| GB | 2225543 | * | 6/1990 | ................. 55/521 |
| JP | 4-300612 | * | 10/1992 | ................. 55/DIG. 5 |
| WO | 94/22556 | * | 10/1994 | |
| WO | WO 00/13767 | | 3/2000 | |

OTHER PUBLICATIONS

Wadsworth, L. et al.; "Melt Blown Processing And Characterization Of Fluoropolymer Resins". Inda J. of Nonwovens Research, (1992).

*Primary Examiner*—Richard L. Chiesa
(74) *Attorney, Agent, or Firm*—Leydig, Voit & Mayer, Ltd.

(57) ABSTRACT

A filter may comprise a plurality of pleats, at least one pleat including a pair of pleat legs and pleat tip region. In some embodiments, a thickness of pleat tip region at a point spaced about one to four pleat leg thicknesses from the end of the pleat tip region may be less than or equal to about twice the pleat leg thickness or may be less than or equal to a distance between corresponding points on opposing outer surfaces of the pleat legs. A filter may comprise a pleated structure having a plurality of pleats. In some embodiments, the pleated structure may have more than one layer and at least one of the pleats may have a reformed pleat tip region. In other embodiments, the pleated structure may have a pair of pleat legs and at least one of the pleats may have a reformed pleat tip region and contacting pleat legs. A filter may comprise a plurality of pleats, at least one pleat including a pleat tip region having contacting inner surfaces. A method of making a filter may comprise forming a plurality of pleats having pleat tip regions and applying pressure to opposing outer surfaces of at least one pleat tip region. A method of making a filter may also comprise forming a plurality of pleats free of bulbous pleat tip regions. A method of making a filter may comprise forming a plurality of pleats wherein a thickness of each pleat tip region at a point spaced about one to about four pleat leg thicknesses from the end of the pleat tip region is less than or equal to about twice the pleat leg thickness or is less than or equal to a distance between corresponding points on opposing outer surfaces of the pleat legs. An apparatus may comprise one or more dies arranged to reform a pleat tip region of a pleat.

20 Claims, 11 Drawing Sheets

U.S. PATENT DOCUMENTS

| | | | |
|---|---|---|---|
| 3,659,719 A | 5/1972 | Westlin et al. | 210/483 |
| 3,782,082 A | 1/1974 | Smith et al. | 55/494 |
| 3,793,813 A | 2/1974 | McAllister | 55/481 |
| 3,859,068 A | 1/1975 | McLaren et al. | 55/498 |
| 3,914,116 A | 10/1975 | Westlin | 55/500 |
| 4,049,405 A | 9/1977 | Goldsmith et al. | 55/479 |
| 4,061,082 A | 12/1977 | Shuler | 454/298 |
| 4,124,362 A | 11/1978 | Westlin et al. | 55/509 |
| 4,127,397 A | 11/1978 | O'Nan, Jr. et al. | 55/479 |
| 4,164,901 A | 8/1979 | Everett | 454/228 |
| 4,177,050 A * | 12/1979 | Culbert et al. | 55/521 X |
| 4,184,966 A * | 1/1980 | Pall | 55/521 X |
| 4,215,682 A | 8/1980 | Kubik et al. | 128/205.29 |
| 4,452,619 A * | 6/1984 | Wright et al. | 55/DIG. 5 |
| 4,515,609 A | 5/1985 | Cuvelier | 96/422 |
| 4,537,812 A | 8/1985 | Elbers | 428/182 |
| 4,547,950 A | 10/1985 | Thompson | 29/445 |
| 4,600,420 A | 7/1986 | Wydeven et al. | 55/501 |
| 4,650,506 A | 3/1987 | Barris et al. | 55/487 |
| 4,652,285 A | 3/1987 | Greene | 55/498 |
| 4,657,570 A | 4/1987 | Gronholz et al. | 55/385.6 |
| 4,702,269 A | 10/1987 | Schuler | 137/246.12 |
| 4,708,724 A | 11/1987 | Agnew | 55/500 |
| 4,793,051 A | 12/1988 | Golden et al. | 29/525 |
| 4,863,499 A | 9/1989 | Osendorf | 96/134 |
| 4,946,484 A | 8/1990 | Monson et al. | 55/385.2 |
| 4,963,171 A | 10/1990 | Osendorf | 55/355 |
| 5,043,000 A * | 8/1991 | Kadoya | 55/521 X |
| 5,063,926 A | 11/1991 | Forsgren et al. | 128/206.17 |
| 5,066,400 A | 11/1991 | Rocklitz et al. | 210/493.5 |
| 5,089,202 A * | 2/1992 | Lippold | 55/521 X |
| 5,096,473 A | 3/1992 | Sassa et al. | 45/282 |
| 5,096,477 A | 3/1992 | Shinoda et al. | 55/385.2 |
| 5,098,767 A | 3/1992 | Linnersten | 95/273 |
| 5,203,201 A | 4/1993 | Gogins | 73/38 |
| 5,230,455 A * | 7/1993 | Price | 55/DIG. 5 |
| 5,234,739 A | 8/1993 | Tanaru et al. | 428/131 |
| 5,240,479 A * | 8/1993 | Bachinski | 55/521 X |
| 5,252,207 A | 10/1993 | Miller et al. | 210/335 |
| 5,273,560 A * | 12/1993 | Kadoya et al. | 55/521 X |
| 5,279,731 A * | 1/1994 | Cook et al. | 55/521 X |
| 5,306,321 A | 4/1994 | Osendorf | 55/487 |
| 5,374,579 A | 6/1994 | Sassa et al. | 442/324 |
| 5,395,429 A | 3/1995 | Sutsko et al. | 96/273 |
| 5,409,515 A | 4/1995 | Yamamoto et al. | 55/341.1 |
| 5,415,676 A | 5/1995 | Tokar et al. | 55/318 |
| 5,423,892 A | 6/1995 | Kahlbaugh et al. | 55/320 |
| 5,427,597 A | 6/1995 | Osendorf | 55/487 |
| 5,507,847 A | 4/1996 | George et al. | 55/486 |
| 5,531,892 A | 7/1996 | Duffy | 210/493.1 |
| 5,543,047 A | 8/1996 | Stoyell et al. | 210/493.2 |
| 5,611,922 A | 3/1997 | Stene | 210/238 |
| 5,622,537 A | 4/1997 | Kahlbaugh et al. | 55/320 |
| 5,626,820 A | 5/1997 | Kinkead et al. | 422/122 |
| 5,669,949 A | 9/1997 | Dudrey et al. | 55/486 |
| 5,672,399 A | 9/1997 | Kahlbaugh et al. | 428/36.1 |
| 5,674,302 A | 10/1997 | Nakayama et al. | 55/385.3 |
| 5,702,801 A * | 12/1997 | Chien | 156/205 X |
| 5,851,249 A * | 12/1998 | Henda et al. | 55/521 X |

* cited by examiner

PLEATED FILTER AND A METHOD FOR MAKING THE SAME

This application is a 371 of PCT/US99/14439 Jun. 29, 1999 which claims the priority of U.S. Provisional Patent Application No. 60/091,042, filed Jun. 29, 1998, which is incorporated by reference in its entirety.

BACKGROUND OF THE INVENTION

Fluid filtration, e.g., gas filtration or liquid filtration, is important in a wide variety of industrial processes, including in the manufacture of electronic devices. Air filtration, for example, is very important in manufacturing semiconductors. Semiconductors are manufactured in ultra-clean manufacturing facilities called "clean rooms". Unlike ordinary rooms, clean rooms are substantially free of particulate contaminants. Typical clean rooms can have less than 100 particles per cubic foot. If the air in a clean room is not substantially free of particulate contaminants, the particulate contaminants in the air can decrease semiconductor yields. For example, contaminants in the air of a clean room can deposit on an unprotected circuit of a semiconductor potentially short-circuiting and damaging the semiconductor. Damaged semiconductors are usually reworked or discarded as scrap.

Conventional air filters for clean rooms use filter media made from glass fibers. While glass fiber filter media can be capable of filtering particulate contaminants from an incoming air stream, glass fiber filter media itself can produce contaminants which can lower semiconductor yields. For example, conventional glass fiber filter media contains borosilicate glass, which can produce boron-containing contaminants. Fluorine gas (e.g., released from etching processes) and water in the air of a clean room can combine to react with the borosilicate glass fibers in the filter media and produce airborne, boron-containing contaminants such as silicon boride. These airborne, boron-containing contaminants can decrease semiconductor yields by settling on the semiconductors during processing. Silicon boride contaminants, for example, can degrade the electrical properties of semiconductors and consequently decrease semiconductor yields. Since the air in a clean room must be filtered, most semiconductor process engineers simply accept airborne boron contamination as inevitable and employ additional process steps to compensate for the contamination. For instance, a buffered HF (hydrogen fluoride) clean-and-etch step can be added to remove some of the boron contamination from the surface of a semiconductor.

Filtering the clean room air with a filter medium substantially free of boron may reduce the amount of boron contaminants in a clean room. However, conventional filters incorporating substantially boron-free filter media, such as polymeric filter media, may not be advantageous. A filter medium is typically pleated in order to increase the filter surface area for a predefined envelope (e.g., a space defined by a housing or frame). When a polymeric filter medium (e.g., a filter medium formed from a polymeric material such as polymeric fibers) is pleated, the medium can have a tendency to "spring back" in the pleat tip region, resulting in a pleat tip region with a conventional bulbous shape. A pleated filter medium having conventional bulbous-shaped pleat tip regions can disadvantageously have a low number of pleats per unit of length, exhibit high differential pressure when filtering a fluid and/or have a diminished structural stability. Further, due to the "spring back" properties of many polymeric filter media, such media can be difficult to pleat.

FIG. 1 shows a portion of a filter element 20, which includes a pleated filter medium 11 having a plurality of upstream conventional bulbous-shaped pleat tip regions 11(*a*) and downstream conventional bulbous-shaped pleat tip regions 11(*b*). A contaminated fluid stream 21 flowing towards the upstream spaces 12(*a*) between the pleats of the pleated filter medium 11 may be impeded by the upstream conventional bulbous-shaped pleat tip regions 11(*a*). The spaces 12(*a*) between the adjacent upstream conventional bulbous-shaped pleat tip regions 11(*a*) are relatively narrow and may bottleneck the flow of the contaminated fluid stream 21 into the pleated filter medium 11. Eventually, the contaminated fluid stream 21 passes through the pleated filter medium 11 forming a purified fluid stream 22. The purified fluid stream 22 can then flow in the downstream spaces 12(*b*) between the downstream pleat tip regions 11(*b*) of the pleated filter medium 11, before exiting the pleated filter medium 11. As the purified fluid stream 22 flows downstream, the downstream conventional bulbous-shaped pleat tip regions 11(*b*) can impede the flow of the purified fluid stream 22 out of the pleated filter medium 11. The spaces 12(*b*) between the adjacent downstream conventional bulbous-shaped pleat tip regions 11(*b*) are relatively narrow, and may bottleneck the flow of the purified fluid stream 22 out the pleated filter medium 11. The fluid stream lines 17 through the filter element show the bottlenecks at the upstream and downstream pleat tip regions. These bottlenecks greatly increase the pressure drop across the filter element. Consequently, greater upstream pressure may be required to force the contaminated fluid stream 21 past the upstream conventional bulbous-shaped pleat tip regions 11(*a*) and the purified fluid stream 22 past the downstream conventional bulbous-shaped pleat tip regions 11(*b*). Unfortunately, greater upstream fluid pressures require greater energy to compress the contaminated fluid stream.

SUMMARY OF THE INVENTION

One aspect of the invention is directed to a filter element, filter pack or filter composite comprising a pleated filter medium including pleats having a pleat tip region with a predetermined shape.

Another aspect of the invention is directed to a filter comprising a plurality of pleats, at least one pleat including a pair of pleat legs and a pleat tip region. A thickness of the pleat tip region at a point spaced about one to four pleat leg thicknesses from the end of the pleat tip region is less than or equal to about twice the pleat leg thickness.

Another aspect of the invention is directed to a filter comprising a plurality of pleats, at least one pleat including a pair of pleat legs and a pleat tip region. A thickness of the pleat tip region at a point spaced about one to four pleat leg thicknesses from the end of the pleat is less than or equal to a distance between corresponding points on opposing outer surfaces of the pleat legs.

Another aspect of the invention is directed to a filter comprising a pleated structure having a plurality of pleats and more man one layer. At least one of the pleats having a reformed pleat tip region.

Another aspect of the invention is directed to a filter comprising a pleated structure having a plurality of pleats and a pair of pleat legs, at least one of the pleats having a reformed pleat tip region and contacting pleat legs.

Another aspect of the invention is directed to a filter comprising a plurality of pleats, at least one pleat including a pleat tip region having contacting inner surfaces.

Another aspect of the invention is directed to a filter comprising a pleated porous sheet having a polymeric material and a plurality of pleats. At least one pleat includes a pair of pleat legs and a pleat tip region, the pleat tip region including a pre-scored region.

Another aspect of the invention is directed to a method of making a filter comprising: forming a plurality of pleats having pleat tip regions; and applying pressure to opposing outer surfaces of at least one pleat tip region.

Another aspect of the invention is directed to a method of making a filter comprising: forming a plurality of pleats free of bulbous pleat tip regions.

Another aspect of the invention is directed to a method of making a filter comprising: forming a plurality of pleats wherein a thickness of each pleat tip region at eight points spaced about 1 to about 4 pleat leg thicknesses from the end of the pleat tip region is less than or equal to about twice the pleat leg thickness.

Another aspect of the invention is directed to a method of making a filter comprising: forming a plurality of pleats, wherein a thickness of the pleat tip region at eight points spaced about one to about four pleat leg thicknesses from the end of the pleat tip region is less than or equal to a distance between corresponding points on opposing outer surfaces of the pleat leg.

Another aspect of the invention is directed to a method of making a filter comprising: scoring a porous sheet including a polymeric material; and pleating the porous sheet.

Another aspect of the invention is directed to an apparatus comprising one or more dies arranged to reform a pleat tip region of a pleat.

While the filtration of clean room air has been discussed in detail, embodiments of the invention are not limited to filtering clean room air. For example, embodiments of the invention can relate to cabin air filters, which can be used to filter the air of an aircraft cabin, as well as flat and cylindrical pleated filters for liquid service. For example, embodiments of the invention can also be used to filter liquids such as fuel. Further, embodiments of the invention relate to pleated filters useful in dead end filtration, for example, where process fluid flows radially through a cylindrical pleated filter pack, or in cross flow filtration, for example, where process fluid flows axially along a cylindrical pleated filter pack.

Embodiments of the invention can provide for a number of advantages. For example, embodiments of the invention can provide for reduced differential pressure across the filter or filter medium, improved filtration properties, improved flow properties through or along the filter, improved structural properties and/or reduced contaminant production. The systems and methods according to embodiments of the invention can provide for efficient and low cost manufacture of filters and filter media.

DETAILED DESCRIPTION

Pleated filter elements embodying the invention may be configured in a wide variety of ways. For example, the filter element may be configured as a parallelepiped or a cylinder. The pleats of the filter element may include generally parallel or non-parallel legs which are straight or curved and which contact one another or are spaced from one another. U.S. Pat. No. 5,098,767; No. 5,252,207; and No. 5,543,047 and U.S. Patent Application No. 60/099,663 disclose many of these features and are incorporated herein by reference.

In some pleated filter elements embodying the invention, one or more, and preferably all, of the pleats include a pair of pleat legs and a pleat tip region having a predetermined, non-bulbous shape, e.g., a tapered, squared, or rounded shape. A pleat tip region can include any suitable portion near the crest and/or root of a pleat including an apex of the pleat. For example, a pleat tip region may extend any suitable length along a pleat in the vicinity of an apex of the pleat. In the pleat tip regions, the thickness of the pleat tip region at a point in the vicinity of about one to about four pleat leg thicknesses from the end of the pleat tip region can be less than about twice the thickness of a corresponding pleat leg. Other embodiments can be directed to a filter including a pleated porous sheet having a plurality of pleats, at least one pleat comprising a pair of pleat legs and a pleat tip region. A thickness of the sheet at the pleat tip region is less than one pleat leg thickness, and the pleat legs may contact one another. The term "sheet" includes any suitable structure having one or more layers. For example, a "sheet" can include a filter medium having one, two, three, or more layers. In another example, a "sheet" can include a filter composite having several layers in addition to a filter medium, including one or more drainage layers and/or a cushioning layer.

Figure 2A:
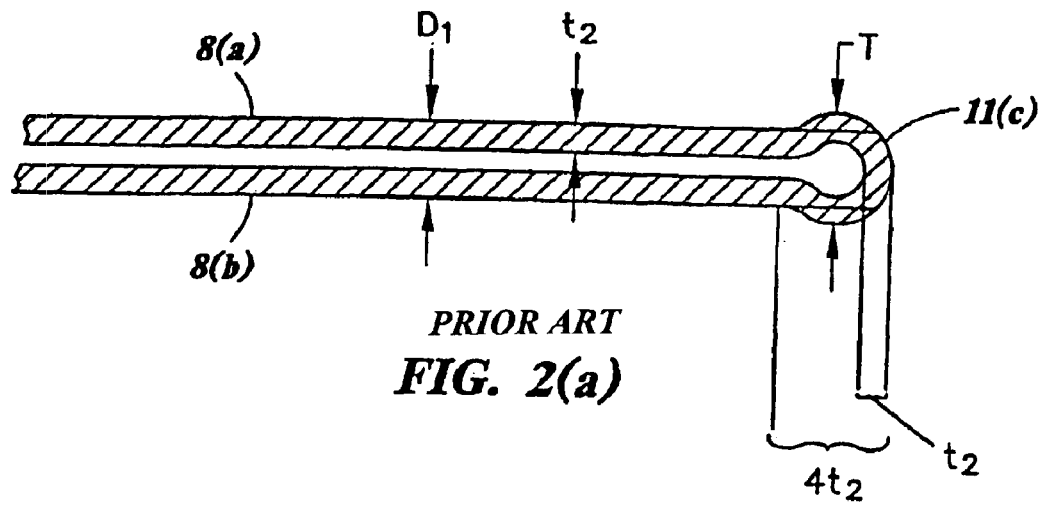
FIGS. 2(a) and 2(b) illustrate cross-sections of pleats.
Figure 2B:
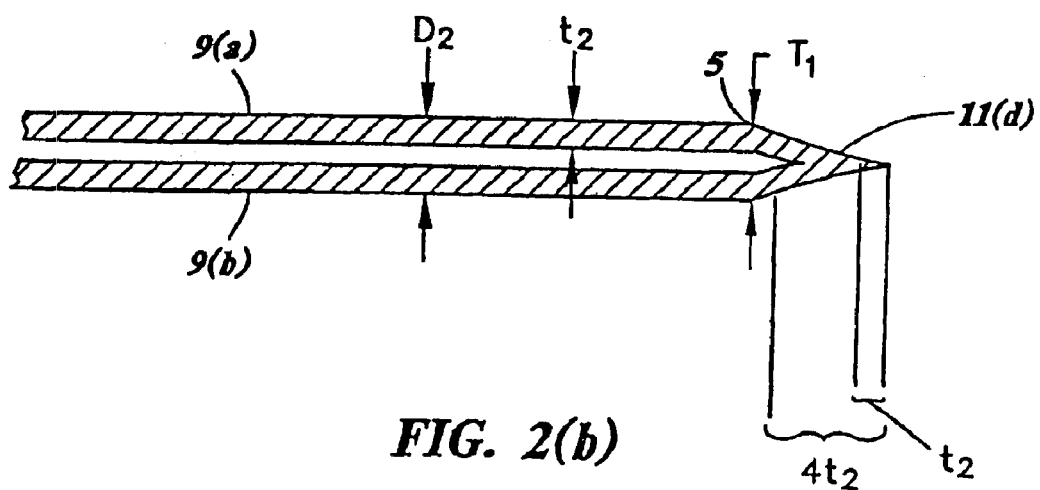

Each of the Figures including FIGS. 2(a) and 2(b) show pleats, and each pleat includes two pleat legs joined at a pleat tip region including an apex of the pleat. Each leg is illustrated as a single layer structure but it is representative of one or more layers and is correspondingly described as a "filter medium" or a "filter composite". Thus, this aspect of the drawing is merely representational. As explained above, a filter medium can have one, two, three, or more layers, and a filter composite can comprise several layers in addition to a filter medium, including one or more drainage layers and/or a cushioning layer. Embodiments of the invention are particularly advantageous for a filter medium or a filter composite having a porous polymeric fibrous medium, such as a polymeric fibrous depth filter medium. Such a medium is very springy and resists the formation of a sharp fold in conventional corrugators. Consequently, conventional filters having fibrous polymeric media have conventional bulbous pleat tip regions, as shown in FIG. 2(a).

The pleat shown in FIG. 2(a) includes two pleat legs 8(a), 8(b) and a pleat tip region 11(c) with a conventional bulbous shape. The conventional bulbous-shaped pleat tip region 11(c) can naturally result from folding a sheet of filter medium or filter composite upon itself. The thickness of the conventional bulbous-shaped pleat tip region 11(c) is greater than the thickness of other portions of the pleat. For example, the thickness T of the pleat tip region is greater than a distance $D_1$ between corresponding points on opposing outer surfaces of the pleat legs 8(a), 8(b). Further, the thickness T of the pleat tip region in the vicinity from about one to about four pleat leg thicknesses from the end of the pleat is greater than twice the thickness $t_2$ of a pleat leg. Consequently, the packing density (e.g., the number of pleats per inch) of similarly shaped adjacent pleats is limited by the thickness the pleat tip regions of the pleats. Also, greater upstream fluid pressures are required to filter a contaminated fluid stream with a pleated filter medium or composite having conventional bulbous-shaped pleat tip regions. As explained previously, the narrow flow passages between adjacent conventional bulbous-shaped pleat tip regions may bottleneck the flow of the contaminated and purified fluid streams into and out of the pleats of the filter medium or composite. Further, the structural stability of the pleat could be improved.

In contrast, FIG. 2(b) illustrates a pleat, for example, a pleat of filter medium or filter composite according to an embodiment of the invention. FIG. 2(b) shows a pleat of a polymeric medium, such as a fibrous polymeric medium, having a non-bulbous shaped pleat tip region 11(d) and two pleat legs 9(a), 9(b) disposed generally parallel to one another. The pleat tip region 11(d) may be tapered and/or may have improved structural stability. The thickness of the pleat tip region 11(d) is less than the thickness of other portions of the pleat. For example, the thickness of the pleat tip region, $T_1$, is less than a distance $D_2$ between corresponding points on opposing outer surfaces of the pleat legs 9(a), 9(b). Further, the thickness of the pleat tip region at a point in the vicinity of about one to about four pleat leg thicknesses $t_2$, preferably about one to two pleat leg thicknesses $t_2$, and more preferably about one pleat leg thickness $t_2$, from the end of the pleat tip region is less than or equal to about twice the thickness $t_2$ of a corresponding pleat leg. Because the pleat shown in FIG. 2(b) has a narrowly confined pleat tip region, the proximity of similarly shaped adjacent pleats is not limited by thickness of the pleat tip regions. Consequently, the pleats of the pleated filter medium or composite having non-bulbous shaped pleat tip regions can be packed closer together than a corresponding medium or composite having conventional bulbous-shaped pleat tip regions.

Closely packed pleats or high packing efficiencies can be advantageous. In embodiments of the invention, the number of pleats per length may be increased by up to 80% to 100% or more. For example, a pleated filter medium or filter composite having conventional bulbous-shaped pleat tip regions and an average pleat leg thickness of about $30/1000$ inch may have a maximum of 6 or 7 pleats per inch. In contrast, a pleated filter medium or composite having the same pleat leg thickness but with pleat tip regions in accordance with embodiments of the invention, can have between about 10 and 12 pleats per inch. Advantageously, a filter element including a pleated filter medium or filter composite having closely packed pleats can have improved filtration properties, because the effective filtration area for a predetermined envelope (e.g., a space defined by a housing) can be increased.

The advantage of having closely packed pleats is even more evident when such pleats ar used in conjunction with cylindrical pleated filters where the number of pleats is typically inversely proportional to two times the thickness of the pleated material (e.g., the thickness corresponding to a single pleat of material). By providing (e.g., by reforming) a pleated sheet with pleat tip regions with a thickness of less than about two times the thickness at a pleat leg, the number of pleats and thus the effective filter area for a given envelope can be increased proportionally. For instance, in embodiments of the invention, increases in the number of pleats and/or effective filter area can be greater than or equal to about 15% in comparison with conventional pleated structures.

Embodiments of the invention can provide for other advantages. A pleated filter medium or filter composite without bulbous shaped pleat tip regions can provide improved flow properties through or along the filter. For example, eliminating the bulbous shaped pleat tip regions from a cross flow filter embodying the invention eliminates large channels through which the process fluid would otherwise preferentially flow. This provides more even contact between the process fluid and the entire filter medium and enhances residence time within the filter. On the permeate side of the filter eliminating the bulbous shaped pleat tip regions eliminates preferential flow of permeate into these bulbous-shaped channels, providing a more even flow through the filter medium.

A pleated filter medium or filter composite without bulbous shaped pleat tip regions can also provide for lower differential pressure across the medium or composite. For example, a pleated filter medium or filter composite having non-bulbous shaped pleat tip regions can have wider and/or more uniform fluid flow passages between adjacent pleats than a pleated filter medium or filter composite having conventional bulbous-shaped pleat tip regions. These wider and/or more uniform flow passages permit fluid streams to flow into and past the pleated filter medium or composite with greater ease and with less upstream fluid pressure. This advantage can be more clearly illustrated with reference to FIG. 3.

Figure 1:
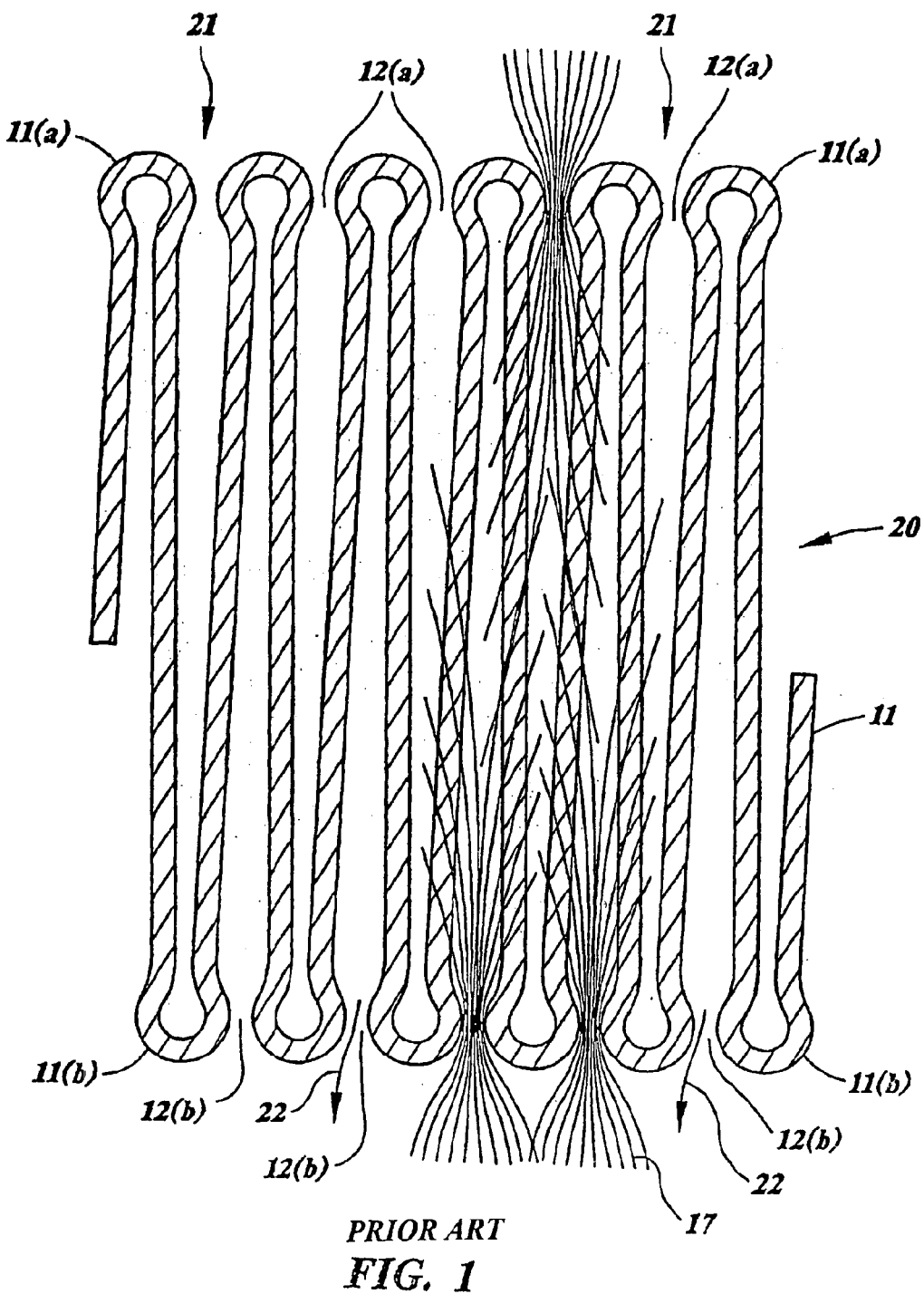
FIG. 1 illustrates a side view of a filter element including a filter medium having conventional bulbous-shaped pleat tip regions.
Figure 3:
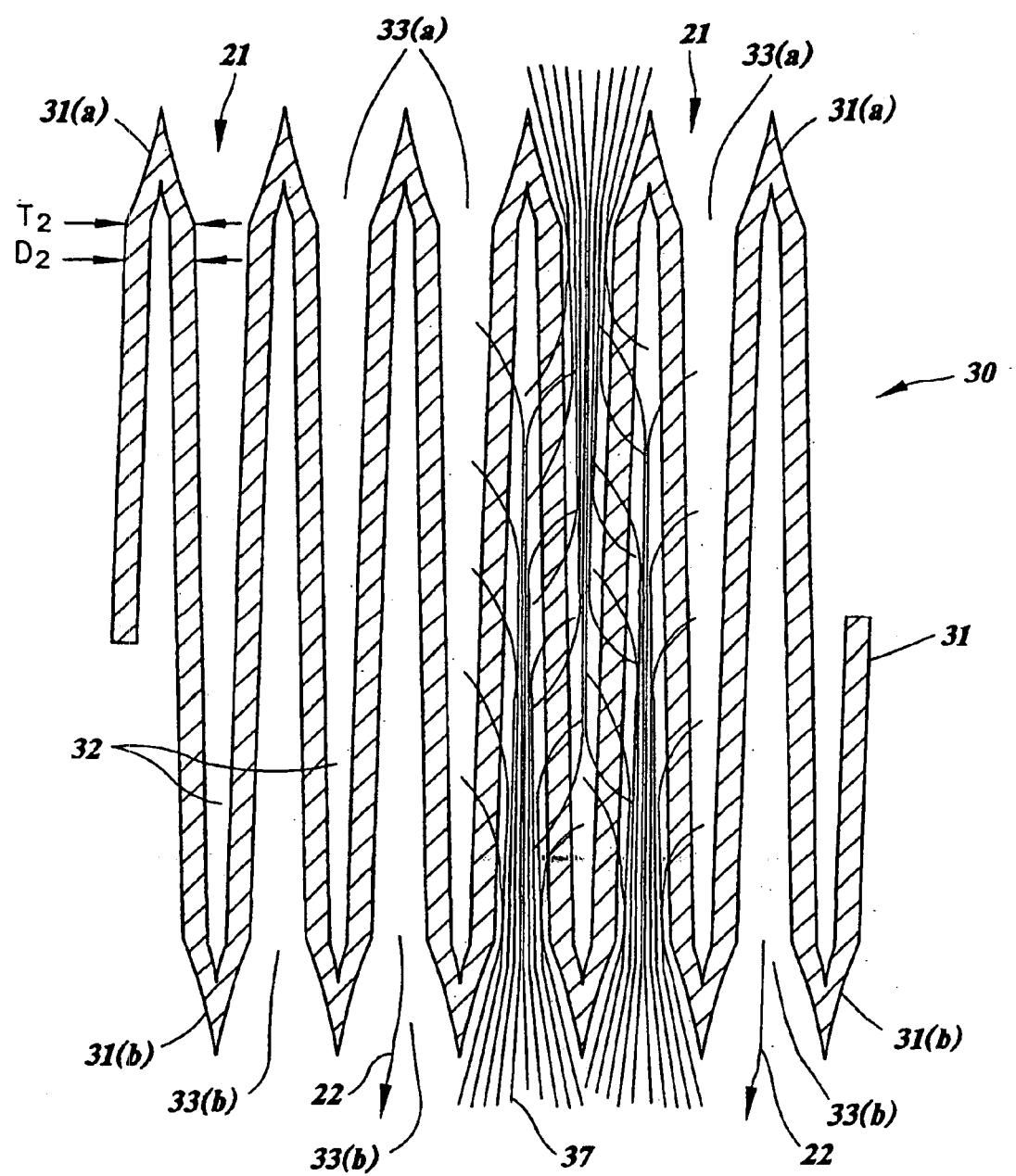
FIG. 3 illustrates a side view of a filter element of an embodiment of the invention.

FIG. 3 shows a portion of a pleated filter element 30 including a pleated filter medium or filter composite 31. The pleated filter medium or filter composite 31 includes a plurality of upstream and downstream pleat tip regions 31(a), 31(b) embodying the invention. Each of the pleat tip regions 31(a), 31(b) may include a maximum thickness $T_2$ which can be less than or equal to a minimum distance $D_2$ between opposing outer surfaces of corresponding pleat legs. Further, the thickness of each pleat tip region at a point in the vicinity of about one to about four pleat leg thicknesses, preferably about one to two pleat leg thicknesses, and more preferably about one pleat leg thickness from the end of the pleat tip region is less than or equal to about twice the pleat leg thickness. Because the upstream pleat tip regions 31(a) of the pleated filter medium 31 are substantially free of a conventional bulbous-shape, a contaminated fluid stream 21 can flow relatively unimpeded into the upstream spaces 33(a) between adjacent upstream pleat tip regions 31(a), and into the spaces 32 between the pleats of the pleated filter medium 31. The contaminated fluid stream 21 then passes through the pleated filter medium 31 forming a purified fluid stream 22. The purified fluid stream 22 can then flow downstream out of the pleated filter medium 31 relatively unimpeded in the downstream spaces 33(b) between adjacent downstream pleat tip regions 31(b). Less upstream pressure and energy are required to filter a contaminated fluid with the filter element 30 shown in FIG. 3 than the filter element 20 shown in FIG. 1. This is because the filter medium 31 in FIG. 3 does not have conventional bulbous-shaped pleat tip regions which impede the flow of the contaminated and purified fluid streams 21, 22 between the pleat tip regions 31(a), 31(b). As illustrated by the fluid stream lies 37, the flow of the contaminated fluid stream 21 and the purified fluid stream 22 is not substantially impeded in the spaces between the pleat tip regions 31(a), 31(b).

Embodiments of the invention can have pleat tip regions with any suitable shape. For example, the inner surfaces of the pleat tip regions may have any suitable shape, including a flat, pointed, tapered, squared, rounded, triangular or irregular shape. The outer surfaces of the pleat tip regions may also have any suitable shape, such as a tapered, pointed, flat, rounded, oblong, squared, triangular, or irregular shape. Regardless of the particular pleat tip region shape, the thickness of a pleat tip region is preferably less than about two times the thickness of a pleat leg and/or is less than a distance between corresponding points on opposing outer surfaces of the pleat legs.

If the shape of the outer and/or inner surface of the pleat tip region is tapered, the taper may be either gradual or intermittent (e.g., stepped). Tapered pleat tip regions advantageously do not substantially impede the flow of an approaching or passing fluid stream. As explained previously, adjusting the shape of the pleat tip regions of a pleated filter medium or composite can reduce the differential pressure across the medium or composite and can also increase the packing efficiency of the pleats.

Figure 4A:
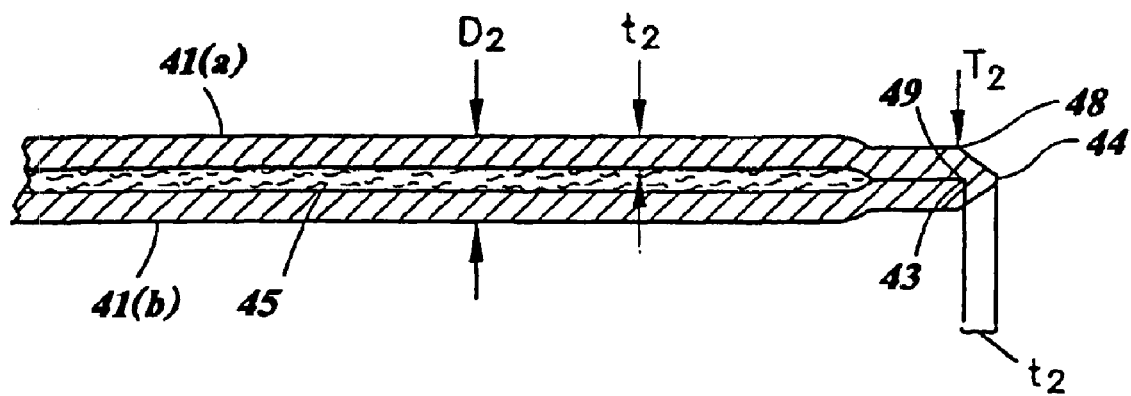
FIGS. 4(a)–4(c) show cross-sectional views of pleats.

FIG. 4(a) shows a pleat of filter medium or filter composite in accordance with another embodiment of the invention. The pleat has an inside and outside surface, and includes two pleat legs 41(a), 41(b), as well as a pleat tip region with an outer end 44. Inner surfaces of the pleat can face and contact each other in or near the vicinity of the pleat tip region. A spacer 45 may lie between the substantially parallel pleat legs 41(a), 41(b), but preferably does not disrupt the contact between the contacting and facing surfaces of the pleat at the pleat tip region. Each of the pleat legs 41(a), 41(b) has a thickness $t_2$. At a point 48 spaced a distance in the range from about $t_2$ to about $4t_2$, preferably about $t_2$ to $2t_2$, and more preferably about $t_2$ (i.e., a distance equal to about the thickness of a pleat leg) from the end 44 of the pleat tip region, the thickness of the pleat tip region is no greater than about twice the thickness of a pleat leg 41(a), 41(b), or is less than or equal to about two times $t_2$. Thus, the thickness $T_2$ may be less than or substantially equal to any rational number R times the thickness of a pleat leg where R is less than about two and greater than about zero (e.g., 1.95, 1.5, 1.0). The thickness $T_2$ at this point 48 is also less than a distance $D_2$ between corresponding points on opposing outer surfaces of the pleat legs 41(a), 41(b). In this embodiment, the point 48 spaced a distance $t_2$ from the end of the pleat tip region substantially corresponds to a point 43 on the inside surface at the apex 49 of the pleat and opposite the end 44 of the pleat.

As illustrated by the pleat shown in FIG. 4(a), a spacer comprising, for example, a drainage layer may be optionally present within the pleat. For example, a spacer may be positioned between adjacent pleat legs, partially or completely filling the space between the pleat legs and/or the facing surfaces at the pleat tip region. The spacer may extend partially or completely into the pleat tip region, or it may terminate short of the pleat tip region. While a drainage layer has been described as a spacer for illustrative purposes, the spacer may include such structures as adhesive beads, porous strips, or any combination of structures suitable for spacing the facing surfaces of a pleat.

Also, as illustrated by the pleat shown in FIG. 4(a), facing inner surfaces of the pleat preferably contact each other at the pleat tip region. By keeping the facing inner surfaces the pleat in contact at a pleat tip region, the pleat tip region is less likely to bulge into a conventional bulbous-shape and is more stable. In some embodiments, facing portions of a pleat tip region can be bonded together, thus preventing the pleat tip region from forming a conventional bulbous shape. This adherence and bonding can be facilitated by any suitable method. For example, the facing surfaces of a pleat tip region can be bonded together by contacting and heat bonding the facing surfaces together. Other exemplary methods for contacting and/or bonding facing surfaces at the pleat tip region are described below.

Figure 4B:
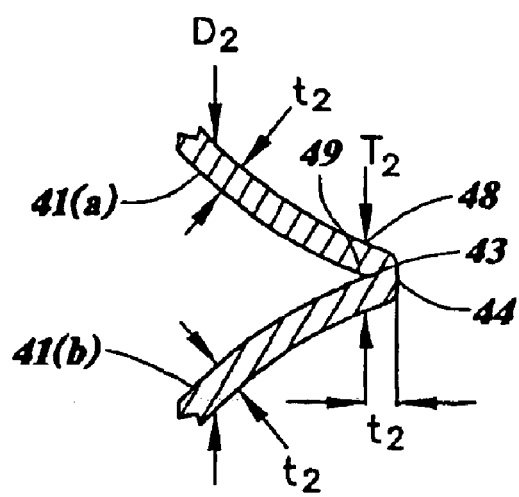

FIG. 4(b) shows another pleat in accordance with an embodiment of the invention. The pleat shown in FIG. 4(b) includes inner and outer surfaces, two pleat legs 41(a), 41(b) forming a general V-shape, and a pleat tip region including an end 44. Each of the pleat legs 41(a), 41(b) has a thickness $t_2$. At a point 48 spaced a distance about $t_2$ (i.e., about equal to a thickness of a pleat leg) from the end 44 of the pleat, the thickness of the pleat tip region is $T_2$. The thickness $T_2$ is less than a distance $D_2$ between corresponding points on opposing outer surfaces of the pleat legs 41(a), 41(b), and is less than or substantially equal to twice the pleat leg thickness ($2t_2$). Like the embodiment illustrated in FIG. 4(a), the point 48 spaced a distance about $t_2$ from the end 44 substantially corresponds to a point 43 on the inside surface of the pleat at the apex 49.

Figure 4C:
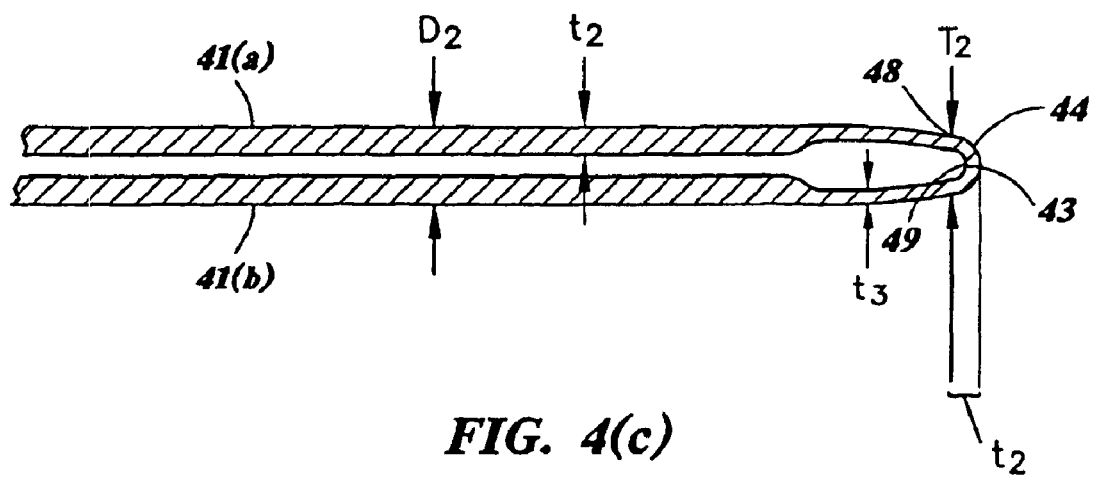

FIG. 4(c) illustrates a pleat of a porous sheet of a filter medium or filter composite according to another embodiment of the invention. The pleat shown in FIG. 4(c) includes inner and outer surfaces, two pleat legs 41(a), 41(b), and a pleat tip region with an end 44. Each of the pleat legs 41(a), 41(b) has a thickness $t_2$, while a portion of the pleat at the pleat tip region can have a thickness equal to $t_3$, which is less than the pleat leg thickness $t_2$. The thickness at the pleat tip region (e.g., $t_3$) can be less than or substantially equal to any rational number R times the thickness of a pleat leg, where R is less than or equal to 1, but greater than zero (e.g., 0.99, 0.9, 0.75, 0.5, 0.33, 0.2). This thickness (e.g., $t_3$) can be measured at a point spaced inwardly from the end 44 of the pleat or a point 43 opposite the end 44 (e.g., a distance between about one to about four pleat leg thicknesses from the end 44 of the pleat).

The thickness of the porous sheet can be reduced prior to, concurrent with, or after the formation of the pleats. In one example a porous sheet of filter medium or filter composite can be pre-scored with a plurality of substantially parallel lines or stripes, so that the scored lines substantially correspond to the later formed apexes and/or a portion of all of the pleat tip region of the resulting pleated structure. The scoring process can reduce the thickness of the filter medium or the filter composite at the pleat tip region of the pleat, e.g., by pressing score lines into the medium or composite with a pressure applicator such as a roller and/or heater. Scoring processes in accordance with embodiments of the invention are in more detail below. Alternatively, the thickness of the sheet can be reduced concurrent with the formation of the pleats. In another example, a porous sheet can be pleated by conforming the porous sheet around one or more heated or non-heated mandrels or dies. Pressure and/or heat from the mandrel or dies can be applied to the outer and/or inner surface of the sheet to reduce the thickness of the sheet at the pleat tip region (e.g., by melting and/or compression of the sheet) while the pleat is being formed.

Again with reference to FIG. 4(c), at a point 48 spaced a distance about $t_2$ (i.e., about equal to the thickness of a pleat leg) from the end 44 of the pleat, the thickness of the pleat tip region is $T_2$. The thickness $T_2$ is less than or substantially equal to about twice the thickness of one of the pleat legs 41(a), 41(b) or about two times $t_2$. The thickness $T_2$ is also less than a distance $D_2$ between corresponding points on opposing outer surfaces of the pleat legs 41(a), 41(b). Unlike the embodiments illustrated in FIGS. 4(a) and 4(b), the point 48 spaced a distance about $t_2$ from the end 44 of the pleat does not substantially corresponding to a point 43 on the inside surface of the pleat at the apex 49 and opposite the end 44 of the pleat. In addition, unlike the embodiment shown in FIG. 4(a), facing surfaces of the pleat at the pleat tip region do not contact each other. Although facing surfaces of the pleat at the pleat tip region do not contact each other in the illustrated embodiment, the shape of the pleat tip region remains substantially non-bulbous. Alternatively, facing surfaces of the pleat tip region (e.g., including the point 43 opposite the end 44 of the pleat) may contact each other to, e.g., improve the stability of the pleat tip region, and/or reduce the likelihood that pleat tip region will form into conventional bulbous shape. As explained previously, a pleated filter element without conventional bulbous shaped pleat tip regions can advantageously provide the filter element with a higher packing efficiency and a reduced pressure differential across the filter element.

In some embodiments, a porous sheet having one or more layers of filter medium or filter composite may be pre-scored with substantially parallel lines having any suitable width, prior to pleating the sheet. The scoring of the sheet may occur in any suitable manner, including heating, scribing, melting, embossing and/or pressing. The scoring of the sheet can be performed with any suitable device, including a rotary pleater, edge knife, roller, die, etc. Preferably, the scoring of the sheet forms pre-scored regions of reduced thickness relative to other portions of the sheet. For example, a porous polymeric sheet of filter medium or composite can be scored by pressing substantially parallel lines in the sheet with one or more heated or non-heated pressure applicators (e.g., rollers, blades). Heat and/or pressure from the pressure applicator(s) can melt and/or reduce the thickness of the sheet, thus forming pre-scored regions. This pre-scored sheet can then be pleated. For example, the scored sheet can be formed into a pleated filter medium or composite by folding the sheet multiple times in a zig-zag manner so that pre-scores on the sheet substantially correspond with the apexes of the resulting pleated filter medium or filter composite.

Figure 9A:
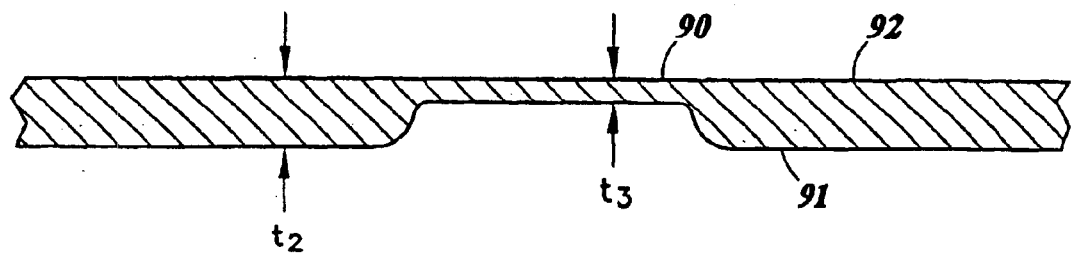
FIGS. 9(a)–9(f) show cross-sectional views of pre-scored sheets and pleats.
Figure 9B:
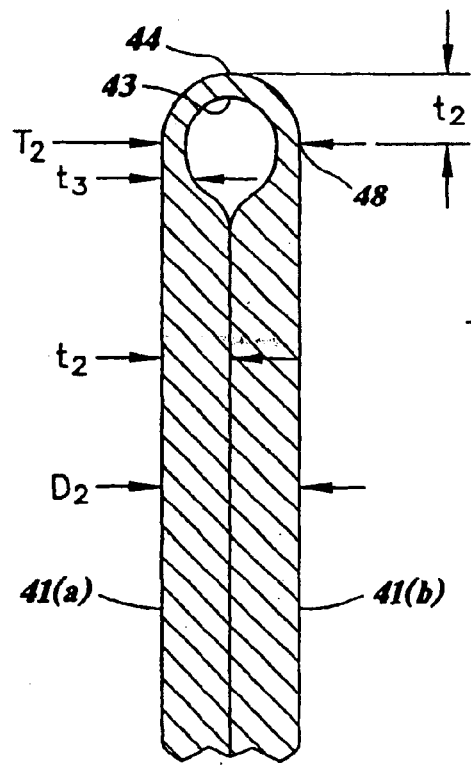

In one embodiment, a sheet of filter medium or filter composite may be-scored to create a discontinuous surface on one side and a continuous surface on the other. The sheet can then be pleated so that the continuous surface side of the sheet forms the end of the pleat. This can be more clearly illustrated in FIGS. 9(a) and (b). FIG. 9(a) illustrates a sheet of filter medium or filter composite having a thickness $t_2$ at a non-scored region and a thickness $t_3$ at a pre-scored region 90. The sheet includes a discontinuous surface 91 and a continuous surface 92. The sheet can then be pleated so that side having the continuous surface 90 forms the end 44 of the pleat. The resulting pleat is shown in FIG. 9(b). The pleat shown in FIG. 9(b) is similar in shape to the pleat shown in FIG. 4(c), except that the pleat in FIG. 9(b) shows contacting pleat legs. Advantageously, by contacting the legs of the pleats in a pleated structure, the number of pleats per length can be increased, thus increasing the filter capacity of the pleated structure.

Figure 9C:
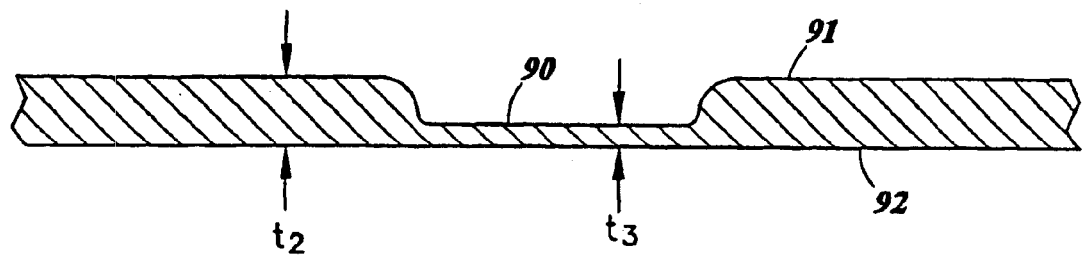

In another embodiment, the pre-scored sheet can then be pleated so that the discontinuous surface side of the sheet forms the end of the pleat. This can be more clearly illustrated in FIGS. 9(c) and 9(d). FIG. 9(c) illustrates a sheet of filter medium or filter composite having a thickness $t_2$ at a non-scored region and a thickness $t_3$ at a pre-scored region 90. The sheet includes a discontinuous surface 91 and a continuous surface 92. The sheet can then be pleated so that the discontinuous surface side 90 of the sheet forms the end of the pleat 44. The resulting pleat is shown in FIG. 9(d).

Figure 9D:
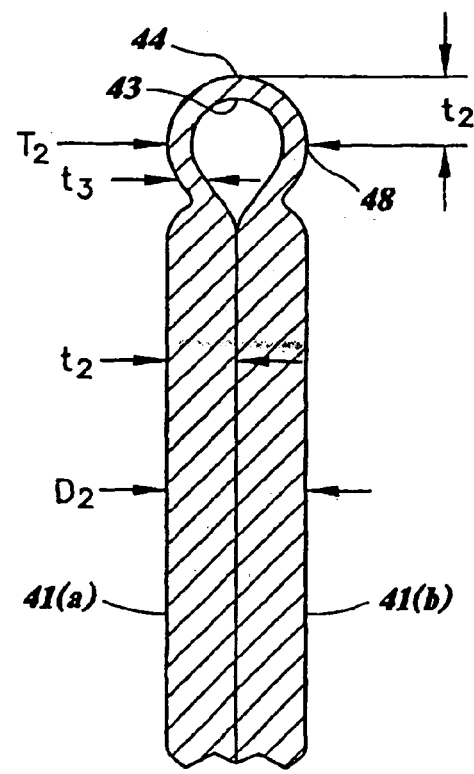

The pleats shown in FIGS. 9(b) and 9(d) each include inner and outer surfaces, two pleat legs 41(a), 41(b), and a pleat tip region with an end 44. Each of the pleat legs 41(a), 41(b) has a thickness $t_2$. The thickness of the sheet at the pleat tip region (e.g., $t_3$) can be less than or substantially equal to any rational number R times the thickness of a pleat leg, where R is less than or equal to 1, but greater than zero (e.g., 0.99, 0.9, 0.75, 0.5, 0.33, 0.2). This thickness (e.g., $t_3$) can be measured at a distance inward from the end 44 of the pleat or a point 43 opposite the end 44 of the pleat (e.g., between about one to about four pleat leg thicknesses from the end 44 of the pleat tip region). At a point 48 spaced about one pleat leg thickness $t_2$ from the end 44 of the pleat tip region, the thickness of the pleat tip region can be $T_2$. This thickness, $T_2$, can be less than or equal to a distance $D_2$ between corresponding points on opposing outer surfaces of the pleat legs 41(a), 41(b), and less than or equal to twice the pleat leg thickness ($2t_2$). The pleat tip region of the pleat shown in FIGS. 9(b) and (d) can be structurally stable, thin, and easily formed.

Figure 9E:
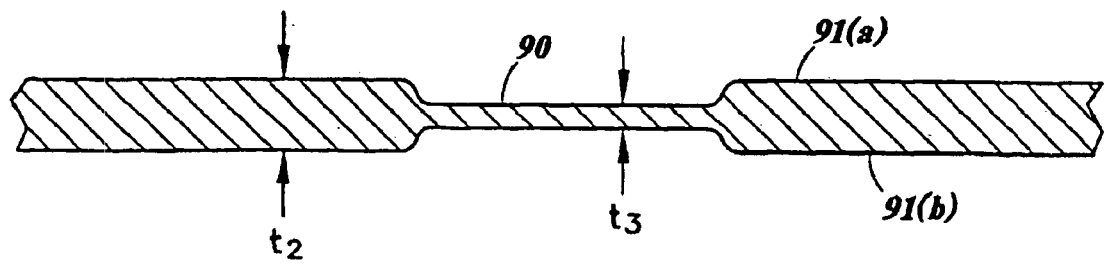

Alternatively, the porous sheet can be pre-scored so that discontinuous surfaces are present on opposing sides of the sheet. This is more clearly illustrated with respect to FIGS. 9(e) and 9(f). FIG. 9(e) illustrates a sheet of filter medium or filter composite having a thickness $t_2$ at a non-scored region and a thickness $t_3$ at a pre-scored region 90. The sheet includes a first discontinuous surface 91(a) on one side of the sheet and a second discontinuous surface 91(b) on the other side of the sheet. As shown in FIG. 9(e), the discontinuities on opposing sides of the sheet can substantially correspond to each other, and can be formed by, e.g., scoring opposite sides of the sheet. Scoring opposite sides of the sheet may increase the stability of the pleat tip region by ensuring that the material at both sides of the sheet is sufficiently compressed. The sheet can then be pleated. The resulting pleat is shown in FIG. 9(f).

Figure 9F:
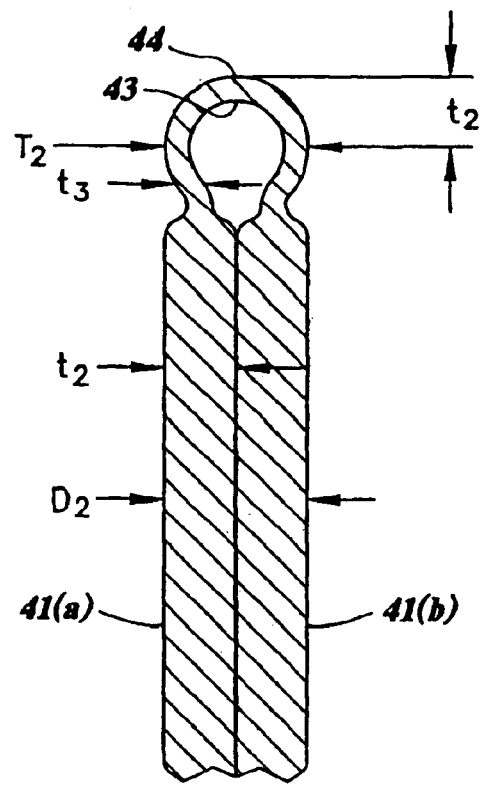

The pleat shown in FIG. 9(f) includes inner and outer surfaces, two pleat legs 41(a), 41(b), and a pleat tip region with an end 44. Each of the pleat legs 41(a), 41(b) has the thickness $t_2$. The thickness of the sheet at the pleat tip region (e.g., $t_3$) can be less than or substantially equal to any rational number R times the thickness of a pleat leg, where R is less than or equal to 1, but greater than zero (e.g., 0.99, 0.9, 0.75, 0.5, 0.33, 0.2). This thickness (e.g., $t_3$) can be measured at a distance inward from the end 44 of the pleat or a point 43 opposite the end 44 of the pleat (e.g., between about one to about four pleat leg thicknesses from the end 44 of the pleat tip region). At a point 48 spaced about one pleat leg thickness $t_2$ from the end 44 of the pleat tip region, the thickness of the pleat tip region can be $T_2$. This thickness, $T_2$, can be less than a distance $D_2$ between corresponding points on opposing outer surfaces of the pleat legs 41(a), 41(b), and less than twice the pleat leg thickness ($2t_2$).

Pre-scoring a porous sheet and then pleating the porous sheet can be advantageous. For example, pre-scoring a porous sheet before pleating can impart added stability to the subsequently formed pleat tip region, and can make the pleating process easier by, e.g., providing easily identifiable and foldable regions on the porous sheet. In particular, such a process can be especially suitable for forming a stable, pleated polymeric filter such as a pleated fluoropolymeric filter. For example, a somewhat springy porous sheet of filter medium or filter composite can be easily pleated by, e.g., providing the sheet with pre-scored regions having a reduced thickness and then pleating the sheet along the pre-scored regions.

However, in a preferred embodiment, the pleat tip region is reformed rather than pre-scored or in addition to being pre-scored. For example, a filter medium or filter composite can be corrugated in a conventional corrugator, forming one or more pleats with pleat tip regions. Preferably, one or more, and more preferably all, of the pleat tip regions, including the entire region or continuous or discontinuous portions of each pleat tip region, thereafter may be reformed to ensure the pleat tip regions do not have a conventional bulbous shape.

If discontinuous portions of the pleat tip region are reformed, the end of the pleat tip region may or may not be reformed. For example, a portion of the pleat tip region spaced from the end of the pleat, but not including the end of the pleat, can be reformed to ensure that the pleat tip region (e.g., as a whole) does not have a conventional bulbous shape. In one illustrative example, facing inner surfaces of the pleat tip region spaced from the end of the pleat, but not including the end of the pleat, can bond together by any suitable method (heat, pressure, adhesive, etc.), thus ensuring that the pleat tip region does not form a conventional bulbous shape and/or does not extend beyond corresponding points on opposing outer surfaces of the pleat legs of the pleat. The portion of the pleat tip region including the bonded region can be spaced one to four pleat leg thicknesses from the end of the pleat tip region and can have a thickness less than about twice the pleat leg thickness.

Reforming methods may include any method which may alter the shape, the composition and/or the internal or external structure of a pleat tip region of a pleat to set the pleat tip region in a non-bulbous shape. Reforming methods may include the application of pressure and/or heat to the pleat tip regions by, e.g., molding, squeezing, crushing, welding, pressing, melting, softening, heating, or any combination of these procedures. Another reforming method may be molding a pleat tip region with pressure, alone or in combination with sonic energy (e.g., ultrasonic) and/or electromagnetic energy (e.g., a radiant heater). Any suitable pressure applicator (e.g., a pair of dies) can shape the pleat tip region by applying pressure to the pleat tip region, for example, on opposite sides of the outer surface of the pleat tip region. Consequently, the applied pressure can bond facing surfaces of the pleat tip region together by, e.g., causing the facing surfaces to intermix or commingle with one another. Preferably, ultrasonic heating and/or welding can be used to reform the pleat tip regions, because ultrasonic heating and/or welding can be performed relatively quickly. Alternatively, the facing surfaces of a pleat at a pleat tip region can bond together by other processes including using an adhesive to bond facing surfaces of the pleat tip region together or solvent bonding facing surfaces of the pleat tip region together.

After the pleat tip regions of the pleats are reformed, the resulting pleat tip regions may have a different composition, internal structure, and/or shape than before the reforming process. For example, if a pleat tip region of a pleat is reformed with heat and pressure, the resulting pleat tip region may comprise not only a reformed shape, but also a fused or solid portion. The fused or solid portion may result from the softening, melting or liquification of the material of the filter medium in the pleat tip region during reformation. For example, a pleat tip region of the pleat may include a porous sheet, such as a fibrous layer or a membrane, made of a low melting point material. The pleat tip region may be heated to reform the pleat tip region. The heat softens or melts the low melting point material, which partially or fully eliminates pores in the pleat tip region, thus creating a partially or fully solid structure in the pleat tip region. Pores in a pleat leg can be unaffected by the pleat tip region reformation process. Alternatively, the pores in the pleat tip region may be unaffected by the application of heat and/or pressure. Illustrative methods and systems for reforming the pleat tip regions of pleated filter media are shown in FIGS. 5–8.

Figure 5:
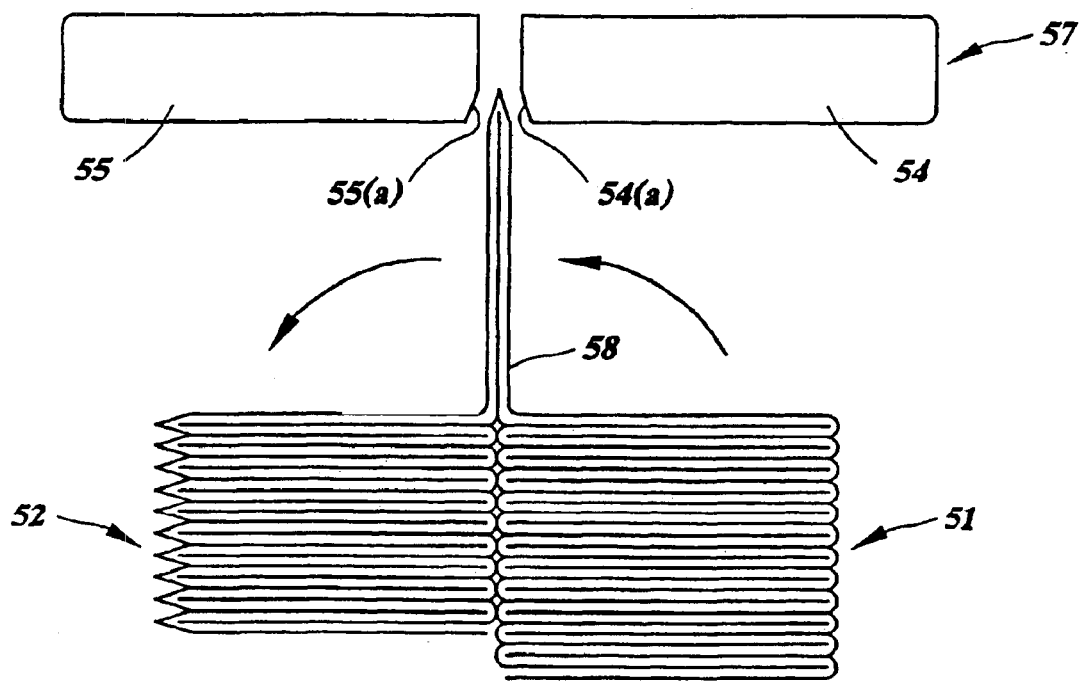
FIGS. 5–8 show methods and systems.

FIG. 5 illustrates a shaping apparatus 57 for reforming the pleat tip regions of a corrugated structure such as a filter medium or filter composite, which has been previously corrugated in any conventional manner. The shaping apparatus 57 can include two dies 54, 55, either or both of which may be movable. The dies 54(a), 55(a) are preferably moveable in directions generally perpendicular to the direction of the pleat having its pleat tip region reformed. For example, the dies 54(a), 55(a) may reform the pleat tip region by applying pressure and/or heat to opposing outer surfaces of the pleat tip region. Each of the dies 54, 55, can include a shaping portion 54(a), 55(a) which, when pressed together, may form a desired pleat tip region shape. For example, when pressed together, cooperating shaping portions 54(a), 55(a) may cooperate to form any of the pleat tip region shapes previously mentioned (e.g., pointed, tapered, rounded). This pressing can also bond facing surfaces of the pleat tip region together (e.g., by causing the facing surfaces to contact each other and liquefy). Although the shaping apparatus 57 illustrated in FIG. 5 has two dies 54, 55, the shaping apparatus 57 may include any suitable number of dies cooperating to form a desired non-bulbous pleat tip region shape. For example, the shaping apparatus 57 may include three dies, which cooperate to form a desired pleat tip region shape.

Although the shaping apparatus 57 may reform the pleat tip regions solely by the application of pressure, the shaping apparatus 57 or the dies 54, 55 of the shaping apparatus 57 may include additional reforming devices (not shown), such as electromagnetic or sonic energy generating devices (e.g., an electric or radiant heater, an ultrasonic generator). For example, one or both of the dies 54, 55 of the shaping apparatus 57 may include a heating device so that heat can be supplied to the pleat tip region being reformed. Heat and pressure from the dies 54, 55 can work in combination to soften and melt the material in the pleat tip region of the pleat, thus increasing the speed and decreasing the difficulty of the reforming process. If heat and pressure are used to reform the pleat tip regions of the pleats, heat and pressure can be applied sequentially (e.g., first heat and then pressure, or the reverse) or concurrently.

In addition, although the shaping apparatus 57 illustrated in FIG. 5 includes a pair of dies 54, 55, the shaping apparatus need not include movable dies or the application of pressure. The shaping apparatus may reform the pleat tip regions solely by the application of heat. For example, the shaping apparatus may comprise a device such as an ultrasonic energy generating device and no dies, so that ultrasonic energy is the primary method for reforming the pleat tip region of the pleat.

An illustrative method for reforming the pleat tip regions of a pleated filter medium or composite can be described with reference to FIG. 5. A pleated filter medium or composite 51 can initially be formed by pleating a sheet of filter medium or composite with a corrugator (not shown), which may or may not be in operative communication with the shaping apparatus 57. For example, a porous sheet of filter medium or composite can be corrugated through a conventional corrugator, thereby forming a pleated filter medium or composite 51 having pleat tip regions, which may include a bulbous shape. For example, one or more layers comprising the filter medium or the filter composite may be formed into a laminate or composite and then co-corrugated to produce a plurality of pleats. Beginning at one end of the plurality of unreformed pleats 51, an individual pleat 58 may be arranged to separate or position the pleat tip region away from the other pleats so that the pleat tip region may be conveniently introduced to the shaping apparatus 57. Once the pleat tip region of the individual pleat 58 is positioned between the dies 54, 55 of the shaping apparatus 57, one or both of the dies 54, 55 of the shaping apparatus 57 may reform the pleat tip region by moving toward each other and toward the pleat tip region in directions generally perpendicular to the pleat 58. Heat and/or pressure can then be applied to the opposing outer surfaces of the pleat tip region to reform it, e.g., fashion it in any of the previously mentioned shapes embodying the invention. Once the pleat tip region is reformed, one or both of the dies 54, 55 can move away from the pleat 58, releasing the reformed pleat tip region. The pleat 58 having the reformed pleat tip region can then be repositioned adjacent to other pleats 52 having reformed pleat tip regions. This process may be repeated until a desired number (e.g., substantially all) of the pleat tip regions along one side of the pleated filter medium or composite 51 have been reformed.

Figure 6:
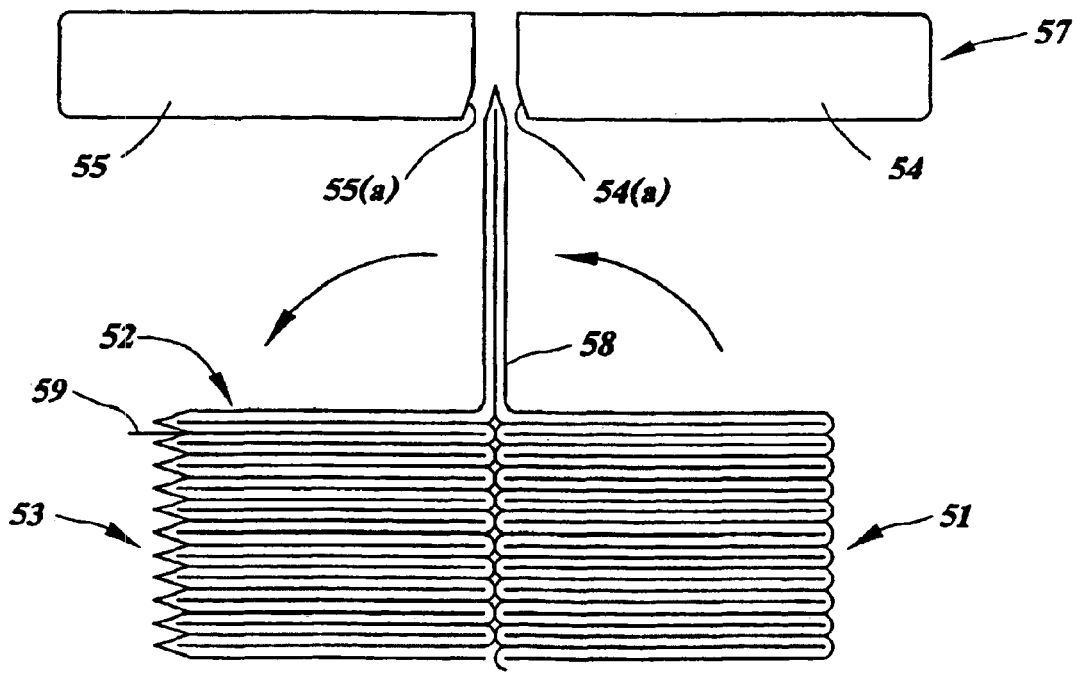
Figure 7:
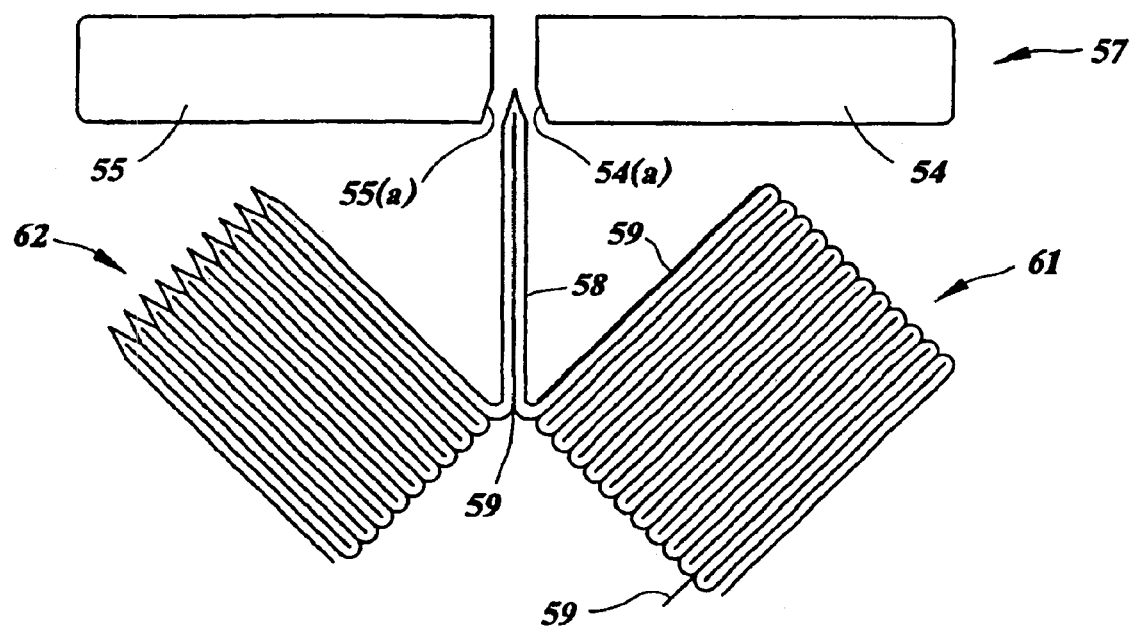
Figure 8:
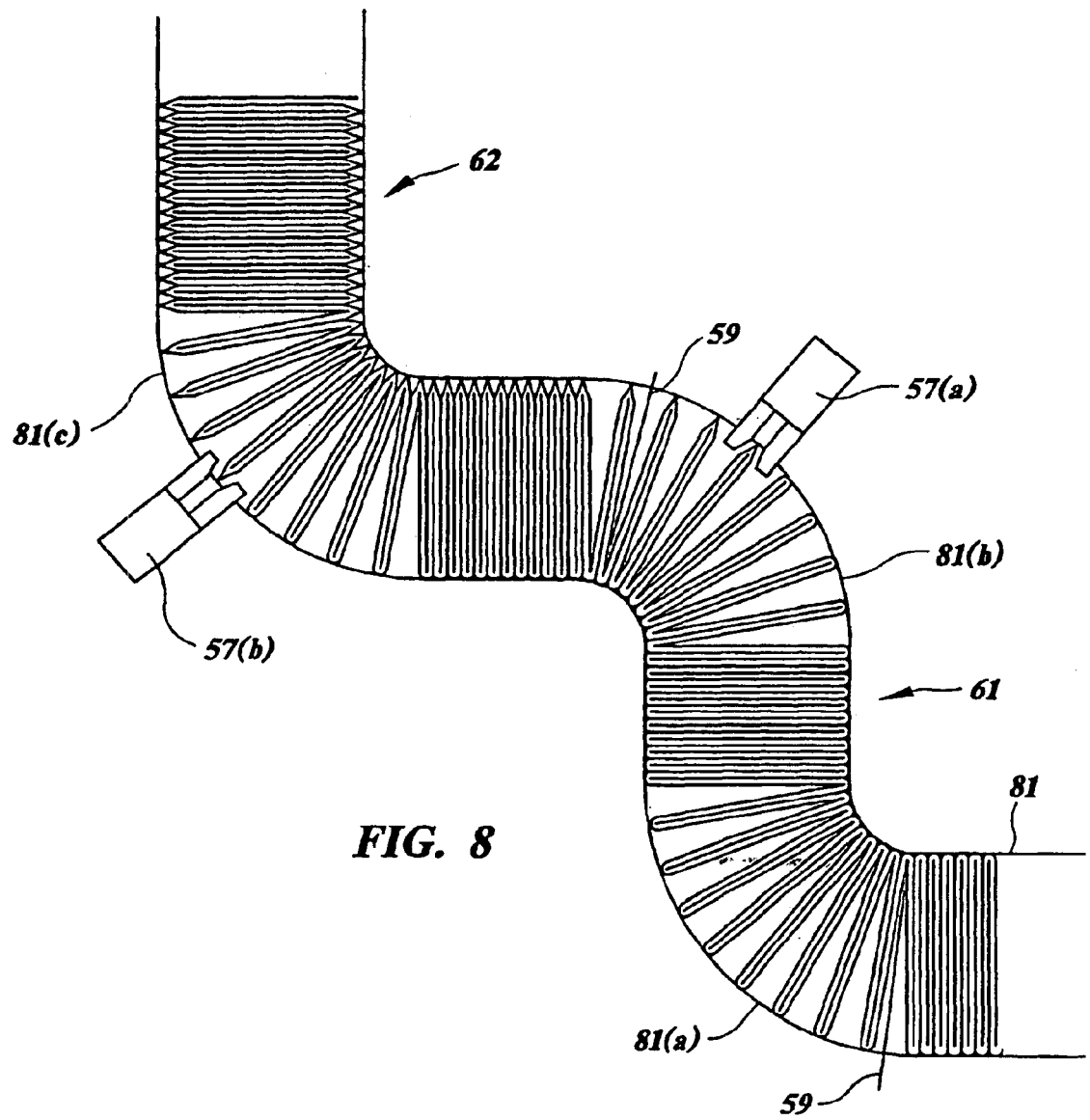

FIGS. 6–8 show one example of a process for forming a filter pack. In the methods illustrated in FIGS. 6–8, a spacer 59, such as a woven or nonwoven fabric or mesh, is inserted within each pleat and/or between adjacent pleats of the pleated filter medium or filter composite to form a filter pack. FIG. 6 shows a method for forming a filter pack having a spacer and a pleated filter medium or filter composite with reformed pleat tip regions. The shaping apparatus 57 shown in FIG. 6 may be similar to the shaping apparatus described in FIG. 5. Like the method shown in FIG. 5, an individual pleat 58 can be positioned away from other pleats 51 and the pleat tip region of the positioned pleat 58 can be introduced between the dies 54, 55 of the shaping apparatus 57. The dies 54, 55 can then reform the pleat tip region by applying heat and/or pressure to the opposing outer surfaces of the pleat tip region. After the pleat tip region is reformed, the pleat tip region may have facing surfaces contacting and/or bonded to each other. As the pleat 58 is repositioned onto the stack of pleats 52 having reformed pleat tip regions, a spacer 59 may be placed between the pleat having a previously reformed pleat tip region and the pleat 58 most recently having its pleat tip region reformed. The relatively wide space created between the positioned and repositioned pleats can also permit the pleat faces to be treated (e.g., coated with an adhesive) in a quick and efficient manner, if desired. Subsequently, the pleat 58 having the reformed pleat tip region can be repositioned adjacent to the spacer 59. This process can be repeated to form a filter pack 53 having plurality of spacers 59 between adjacent pleats, and a pleated filter medium or filter composite having reformed pleat tip regions.

While the method illustrated in FIG. 6 shows a spacer inserted between adjacent pleats immediately after each pleat tip region is reformed, alternative embodiments may insert the spacer after the reformed pleat is repositioned or before the pleat tip region is reformed, e.g., immediately before. For example, FIG. 7 shows another method for forming a filter pack 62. The shaping apparatus 57 may be similar to the previously described shaping apparatus. However, unlike the previously described embodiments, a plurality of spacers 59 are positioned between adjacent pleats and/or within each pleat before the pleat tip regions are reformed. When the pleat tip region of a pleat 58 is reformed with a spacer within the pleat 58, the spacer and the filter medium or filter composite may be integrally attached or bonded at the pleat tip region. For example, the spacer 59 in the pleat 58 having its pleat tip region reformed may comprise a material with a lower melting point than the surrounding filter medium or filter composite portions. During the reformation of the pleat tip region by the dies 54, 55 of the shaping apparatus 57, the material of the spacer can melt and impregnate the surrounding filter medium or filter composite. The resulting reformed pleat tip region can comprise an inter-bonded structure of filter medium or filter composite material and spacer material. This inter-bonded structure can result in a pleat tip region with increased structural stability and a decreasing ability to reform into a bulbous-shape. After the pleat tip region of the pleat 58 is reformed, the reformed pleat tip region can be removed from the shaping apparatus 57 and repositioned next to other pleats with reformed pleat tip regions to form a filter pack 62. After the desired number of pleat tip regions on one side of the filter pack 62 have been reformed, the pleat tip regions on the other side of the formed filter pack 62 may be reformed in a similar or different manner.

In the previous embodiment, the spacer was bonded within each reformed pleat tip region. Alternatively, a spacer may be positioned within a pleat or between pleats; but not be bonded within the pleat tip region. For example, a spacer may be present within a pleat between the legs of the pleat, but not between facing surfaces of the pleat tip region. In this instance, the spacer is within the pleat, but is largely unaffected by the pleat tip region reforming procedure. In this regard, the spacer may occupy substantially all or a portion of the space between pleats or within a pleat.

FIG. 8 shows another embodiment of the invention. The system shown in FIG. 8 includes first and second shaping apparatuses 57(*a*), 57(*b*) on opposing sides of a conveying apparatus 81. The conveying apparatus 81 can define a serpentine-like conveying path with one or more curves such as oppositely bending curves 81(*a*), 81(*b*), 81(*c*). In the illustrative method, a pleated filter medium or composite 61 having unreformed pleat tip regions can be conveyed in a path defined by the conveying apparatus 81. As the pleated filter medium composite 61 having unreformed pleat tip regions approaches a first curve 81(*a*) in the path defined by the conveying device 81, the pleats or the spaces on the first side of the pleated filter medium or filter composite 61 can gradually open, and spacers 59 may be inserted in the spaces between the pleats. The pleated filter medium or filter composite 61 and the spacer(s) 59, can then travel towards the first shaping apparatus 57(*a*) which may be positioned proximate a second curve 81(*b*) in the path defined by the conveying device 81. As the pleated filter medium or composite 61 approaches the curve 81(*b*), the pleats or spaces on the second side of the pleated filter medium or filter composite 61 gradually open. The first shaping apparatus 57(*a*) can then reform the pleat tip regions on the second side in any suitable manner such as those previously described. Additional spacers 59 can also be inserted between the spaces or pleats on the second side. The pleat tip region reforming process can be repeated until the desired number of pleat tip regions, preferably all of them, have been reformed.

Then, the pleated filter medium or composite 61 can travel towards a second shaping apparatus 57(*b*) located proximate a third curve 81(*c*) defined by the conveying apparatus 81. The second shaping apparatus 57(*b*) can be located on the first side of the conveying apparatus 81, opposite the first shaping apparatus 57(*a*). As the pleated filter medium or composite having reformed pleat tip regions on the second side approaches the curve 81(*c*), the spaces or pleats on the first side, i.e., the side having unreformed pleat tip regions, gradually open. Once the spaces between the pleats have opened, the second pleat shaping apparatus 57(*b*) can reform the unreformed pleat tip regions on the first side in any suitable manner such as those previously described. The filter pack 62 leaving the second shaping apparatus 57(*b*)

may have a pleated filter medium or filter composite with reformed pleat tip regions on both sides, and spacers 59 between and/or within the pleats. Thus, the system shown in FIG. 8 can produce a filter pack in a continuous and efficient manner.

The filter medium may be selected in accordance with several factors, including the nature of the fluid being filtered, the nature and size of the contaminants in the fluid, and the acceptable pressure drop across the filter medium. The filter medium may comprise a wide variety of porous microfiltration or ultrafiltration media. The filter medium may consist of only a single sheet or layer or it may comprise multiple sheets and/or layers. If the filter medium comprises multiple layers, it is not necessary that all layers have the same material, shape, thickness or structure.

The filter medium may include any suitable structure and/or material. For example, the filter medium may be a porous sheet such as a supported or unsupported membrane, or a woven or nonwoven fibrous or filamentous sheet, and may be fabricated from a natural or synthetic polymer, glass, ceramic or metal. Preferably, the filter medium comprises a polymeric material, more preferably a fibrous polymeric material, which is substantially free of boron. Polymeric materials may include polyolefins such as polypropylene and polyethylene; fluoropolymers such as PTFE, fluorinated ethylenepropylene (FEP), and perfluoroalkoxy polymers (PFA); polyamides such as nylon and polyaramid; and polyesters. Advantageously, polymeric filter media are less likely to splinter and break that other filter media (e.g., glass), and are less likely to produce contamination (e.g., boron containing contaminants). Other preferred media may include a family of fibrous filter media having various binder resins, and are available from Pall Corporation under the trade names Ultipor® and Pallflex®. Further, the filter medium may be a porous sintered sheet of metallic or ceramic material, such as a sheet of sintered metal powder, fibers and/or filaments.

Furthermore, the filter medium may have any desired pore structure, including a graded pore structure, and any desired nominal pore size. The filter median may also include an electrostatic charge (e.g., an electret filter medium). By providing an electrostatic charge to the filter medium, particulate contaminants can be trapped electrically as well as mechanically. For example, a temporary or permanent electrical charge can be imparted to a polypropylene melt-blown nonwoven web.

The filter medium can also have any suitable removal rating or filtration efficiency. Preferably, the filter medium has high filtration efficiency. For example, the filter medium may have a HEPA (high efficiency particulate air), an ULPA (ultra low penetration air) or a super ULPA removal rating. Preferably, the filter medium can have a removal rating up to 0.1 or 0.3 microns or more, of R, where R is any rational number greater than or equal to about 85% and less than or equal to 100%. Exemplary values of R include: 85.0, 90.0, 95.0, 97.0, 99.5, 99.9, 99.97, 99.997, 99.999, or 99.9999 percent. If the filter medium comprises plural layers, one or more layers may have a HEPA, ULPA, or super ULPA rating. The desired removal rating of the filter medium may depend on the environment in which the filter is employed. For example, particulate filters used in aircraft preferably have a removal rating of at least about 85%, and in clean rooms at least about 99.997%.

The filter medium may form part of a filter composite. In addition to a pleated filter medium, a filter composite may optionally include one or more drainage layers upstream and/or downstream of the filter medium, and/or cushioning layers between the one or more drainage layers and the filter medium.

If the filter composite includes drainage layers, the drainage layers are preferably very open, allowing fluid to flow laterally and to uniformly distribute the fluid across the surface of the filter medium. Thus, the drainage layers typically have a very low edgewise flow resistance, and are much coarser than the filter medium. The drainage layers can also prevent pleated surfaces of the filter medium from coming into contact with one another and thereby reducing the effective surface area of the filter medium. The drainage layers can thus provide positive spacing between adjacent pleats of the filter medium. Further, the drainage layers can be loose or one or more drainage layers can be laminated to one another to provide stiffness to the filter composite and/or improve the shape of the pleat.

Any suitable woven or nonwoven material having good porosity can be used for an upstream drainage layer and/or downstream drainage layer. Furthermore, either layer may be fabricated from one or more of natural fibers, polymeric materials, and/or glass fibers. In a preferred embodiment, the upstream drainage layers comprise mesh, such as an extruded polymeric mesh. The mesh can be fabricated from any polymeric material, including polyester, polypropylene, or polyamide such as nylon, which is suitable for the fluid being filtered and for the applicable filtration parameters such as temperature. The mesh is preferably as smooth as possible to reduce abrasion between it and the underlying layers. Extruded polymeric mesh is generally preferable to other support and drainage materials, including woven and nonwoven fibrous webs and polymeric netting, because it is so smooth and has such a low edgewise flow resistance and because it typically does not shrink during fabrication and corrugation of the filter element.

A principal purpose of the cushioning layer is to prevent abrasion between the drainage layer and the filter medium. The drainage layer typically has good drainage properties because it is fashioned from relatively large fibers or filaments. Consequently, it generally has a rougher surface than the filter medium. When such a material is laminated directly to the filter medium, for example, significant abrasion of the filter medium may result when the filter medium undergoes flexing, for example, due to pressure cycles, and the drainage layer repeatedly rubs against the filter medium. However, when a cushioning layer, which is smoother than a drainage layer and tougher than a filter medium, is interposed between a drainage layer and a filter medium, the abrasion of the filter medium can be greatly reduced, resulting in an increase in the useful life of the filter medium, or corresponding filter pack or filter element.

The cushioning layer is preferably formed of a thin, very porous material. It is also preferably formed from a material which can be characterized as smooth or as smooth and tough. For example, it may be a non-abrasive, nonwoven material with a high tensile strength. A preferred material for the cushioning layer is a wet-laid polyester nonwoven material sold by Hirose Corporation under the trade designation 05TH08. Other preferred materials include a nylon nonwoven material available from Fiberweb North America Inc. under the trade designation Cerex and a nonwoven polyester material available from Reemay Corporation under the trade designation Reemay, such as Reemay 2006 or Reemay 2250.

A filter pack according to embodiments of the invention may include any of the above described filter media or filter composites (e.g., filter laminates). In addition, a filter pack may optionally include spacers. Spacers may include any suitable article which can space surfaces of adjacent pleats or surfaces of a pleat. Exemplary pleat spacers may include combs or structures which fit over the tips of the pleats, or structures such as polymeric beads (e.g., hardened adhesive) or fibrous media (strips) which may lie between the pleats to maintain pleat spacing. Pleat spacers may even include structures, such as dimples or ridges, which are integrally formed in the pleats, for example, in the legs of the pleats, to space adjacent pleat surfaces.

A pleated filter medium, filter composite, or filter pack according to embodiments of the invention can be incorporated into any suitable filter element and can be used in any suitable form. The shape of the filter element is not restricted and may be cylindrical, for example, or parallelepiped. In a preferred embodiment, the filter element may include a frame (e.g., a box-shaped frame) having a pleated filter medium or filter composite including a pleated filter medium or composite disposed in and sealed against the frame. For example, a pleated filter composite having pleat tip regions with a predetermined shape (e.g., tapered) can be mounted within and sealed to a wood, plastic, or metal frame with a potting material such as polyurethane, epoxy, silicone, hot-melt adhesive or plastisol. A filter element having a framed pleated filter medium, filter composite or filter pack can be used, for example, to purify the air or an aircraft cabin or a clean room.

Alternatively, the filter element may comprise a cylindrical structure. A cylindrical filter element may include a previously described pleated filter medium or composite formed in a cylinder around a rigid cylindrical core. Pleat tip regions embodying the invention may be incorporated only at the radially inward roots of the pleats, only at the radially outward crests of the pleats, or both. End caps may secure the cylindrical pleated filter medium to the rigid cylindrical core. If desired, a wrap, cage or other support structure may be disposed around the cylindrical, pleated filter medium or filter composite. Preferably, the filter element can be removable and replaceable when the filter element outlives its useful life (e.g., becomes fouled or damaged).

While the invention has been described in some detail by way of illustration and example, it is understood that the invention is not restricted to the specifically described embodiments in the specification. For example, the present invention encompasses the combination of one or more of the features of any of the embodiments previously described or illustrated with one or more of the features of the other embodiments. Thus, a pleat described or illustrated for any of the embodiments (e.g., FIG. 4(*a*)) may be combined in a filter with a pleat described or illustrated for another embodiment (e.g., FIG. 4(*c*)) and still be encompassed by the invention. The present invention also encompasses any of the embodiments previously described or illustrated where one or more of the features of the embodiment are modified or deleted. As an example, the spacer 45 described and illustrated for the embodiment shown in FIG. 4(*c*)) may be deleted and the pleat is still encompassed by the invention. Thus, the invention includes all modifications, equivalents, and alternatives falling within the spirit and scope of the invention.

What is claimed is:

1. A filter comprising a corrugated sheet including a filter medium folded multiple times in a zig-zag manner to form a plurality of pleats, the pleats including a pair of pleat legs joined in a pleat tip region at an apex of each pleat, wherein each pleat leg has a thickness and the pleat tip region is formed into a non-bulbous, tapered shape having an end and wherein a thickness of the pleat tip region at a point spaced one to four pleat leg thicknesses from the end of the pleat tip region is less than or equal to twice the pleat leg thickness.

2. A filter according to claim 1 wherein the pleat tip region is reformed.

3. A filter according to claim 1 wherein the pleat legs contact each other at the pleat tip region.

4. A filter according to claim 1 wherein the sheet comprises a filter composite including at least one drainage layer and at least one filter medium layer.

5. A filter according to claim 4 wherein the filter composite includes first and second drainage layers, a filter medium layer being positioned between the first and second drainage layers.

6. A filter according to claim 4 wherein a drainage layer comprises a polymeric material.

7. A filter according to claim 4 wherein the filter composite is scored.

8. A filter according to claim 1 wherein the filter medium comprises a polymeric material.

9. A filter according to claim 1 wherein the pleat tip region comprises a fused or solidified portion.

10. A filter according to claim 1 wherein the thickness of the pleat tip region at a point spaced from one to two pleat leg thicknesses from the end of the pleat tip region is less than twice the pleat leg thickness.

11. A method of making a filter comprising:
   folding a sheet including a filter medium multiple times in a zig-zag manner to form a plurality of pleats, wherein the pleats include a pair of pleat legs joined in a pleat tip region at an apex of each pleat and wherein each pleat leg has a thickness; and
   forming the pleat tip regions into a non-bulbous, tapered shape having an end, wherein a thickness of each pleat tip region at a point spaced one to four pleat leg thicknesses from the end of the pleat tip region is less than or equal to twice the pleat leg thickness.

12. A method according to claim 11 wherein forming a plurality of pleats includes corrugating the sheet to form one or more pleats and wherein forming the pleat tip regions includes reforming the pleat tip regions after corrugating the sheet.

13. A method according to claim 12 wherein reforming the pleat tip regions includes applying pressure and/or heat to the pleat tip regions.

14. A method according to claim 13 wherein applying pressure and/or heat to the pleat tip regions includes melting or softening a polymeric material and wherein reforming the pleat tip regions further includes forming a fused or solid portion.

15. A method according to claim 11 wherein forming pleat tip regions includes applying pressure and/or heat to pleat tip regions.

16. A method according to claim 15 wherein applying pressure and/or heat to the pleat tip regions includes melting or softening a polymeric material and then forming a fused or solid portion.

17. A method according to claim 11 wherein forming a plurality of pleats includes scoring the sheet.

18. A method according to claim 11 wherein folding a sheet includes folding a filter composite including first and second drainage layers and the filter medium between them, at least one of the first drainage layer, the second drainage layer and the filter medium comprising a polymeric material, and wherein forming the pleat tip regions includes reforming the pleat tip regions after the filter composite is folded to form the plurality of pleats, reforming the pleats including melting or softening the polymeric material in the pleat tip regions and then fusing or solidifying the polymeric material under pressure to form the non-bulbous, tapered pleat tip regions.

19. A filter comprising a corrugated filter composite including first and second drainage layers and a filter medium positioned between them, at least one of the first drainage layer, the second drainage layer and the filter medium comprising a polymeric material, wherein the corrugated filter composite is folded multiple times in a zig-zag fashion to form a plurality of pleats and each pleat includes a pair legs joined in a pleat tip region at an apex of the pleat, wherein the polymeric material in the pleat tip region is fused or solidified to form a non-bulbous, tapered shape having an end, and wherein each pleat leg has a thickness and, at a point spaced one to four pleat leg thicknesses from the end of each pleat tip region, the pleat tip region has a thickness which is less than or equal to twice the pleat leg thickness.

20. A filter according to claim 19 wherein each pair of pleat legs have facing inner surfaces and the inner surfaces contact each other in the pleat tip region.

* * * * *